(12) United States Patent
Kawada et al.

(10) Patent No.: US 6,959,561 B2
(45) Date of Patent: Nov. 1, 2005

(54) AUTOMOTIVE AIR CONDITIONER

(75) Inventors: Hiroyuki Kawada, Tochigi (JP); Toshio Nashiro, Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 431 days.

(21) Appl. No.: 10/176,378

(22) Filed: Jun. 21, 2002

(65) Prior Publication Data

US 2003/0006033 A1 Jan. 9, 2003

(30) Foreign Application Priority Data

Jun. 22, 2001 (JP) .................................. 2001-189129

(51) Int. Cl.$^7$ .......................... F25D 21/14; B60H 1/00; B60H 3/00
(52) U.S. Cl. .......................... 62/285; 62/291; 62/244; 165/913; 165/42; 165/43; 454/156; 454/160; 454/161; 237/12.3 A; 237/12.3 B
(58) Field of Search .......................... 62/285, 291, 244; 165/152, 153, 913, 42, 43, 202; 454/156, 160, 161; 237/12.3 A, 12.3 B

(56) References Cited

U.S. PATENT DOCUMENTS

| | | | |
|---|---|---|---|
| 4,350,025 A | | 9/1982 | Izumi |
| 4,926,932 A | * | 5/1990 | Ohara et al. ................. 165/111 |
| 5,836,380 A | | 11/1998 | Takesita et al. |
| 6,019,162 A | * | 2/2000 | Saida et al. .................... 165/42 |
| 6,070,425 A | * | 6/2000 | Ito et al. ........................ 62/285 |
| 6,478,083 B1 | * | 11/2002 | Nanba et al. ................ 165/202 |

FOREIGN PATENT DOCUMENTS

| | | | | |
|---|---|---|---|---|
| DE | 198 23 061 A1 | | 11/1998 | |
| JP | 60248997 A | * | 12/1985 | ............. F28F/1/02 |
| JP | 08276721 A | * | 10/1996 | ............. B60H/1/00 |
| JP | 08334277 A | * | 12/1996 | ............ F25B/39/02 |
| JP | 9-95122 A | | 4/1997 | |
| JP | 09095122 A | * | 4/1997 | ............. B60H/1/00 |
| JP | 9-188123 A | | 7/1997 | |
| JP | 11083371 A | * | 3/1999 | ............. F28F/3/08 |
| JP | 11240326 A | * | 9/1999 | ............. B60H/1/32 |
| JP | 2000-6644 | | 1/2000 | |
| JP | 2000006644 A | * | 1/2000 | ............. B60H/1/00 |

* cited by examiner

Primary Examiner—John K. Ford
(74) Attorney, Agent, or Firm—Foley & Lardner LLP

(57) ABSTRACT

An automotive air conditioner comprises a housing having an air flow passage defined therein. The housing includes mutually opposed side walls between which a part of the air flow passage is defined. A fan is installed in an upstream part of the air flow passage to introduce air into the air flow passage. An evaporator is installed in the air flow passage at a position downstream of the fan. The evaporator is of a stack type including a plurality of flat tube elements which are stacked on one another. Every adjacent two of the flat tube elements leave therebetween a clearance which has inlet and outlet sides. The evaporator is postured in such a manner that the flat tube elements extend between the mutually opposed side walls of the housing having the inlet sides of the clearances of the flat tube elements directed upstream toward the fan.

17 Claims, 9 Drawing Sheets

FIG.5
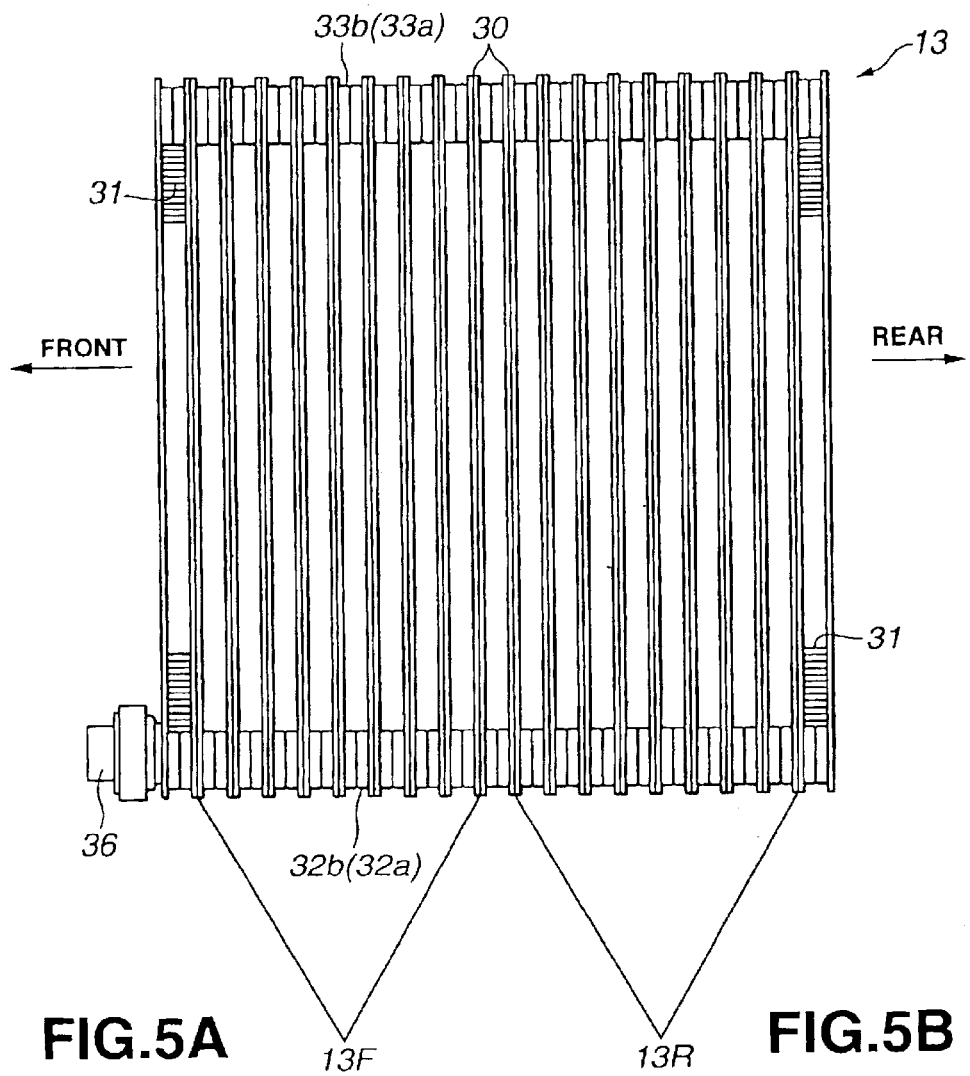
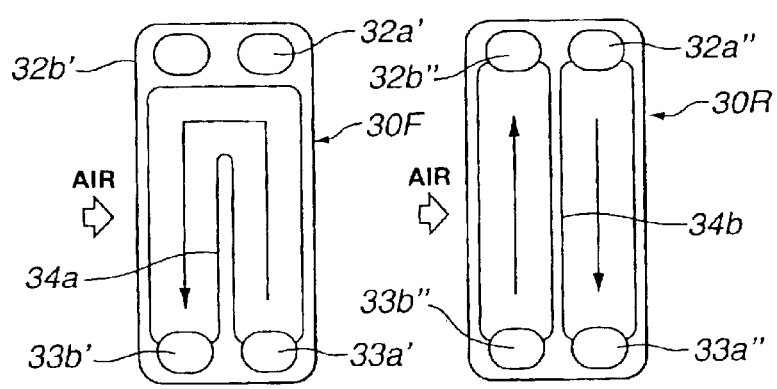
FIG.5A            FIG.5B

AUTOMOTIVE AIR CONDITIONER

BACKGROUND OF THE INVENTION

1. Field of the Invention

The present invention relates in general to automotive air conditioners, and more particularly, to automotive air conditioners of a type which is equipped with means for stopping or at least minimizing conveyance of condensed waterdrops, which have been produced on and dripped from cooling elements of an evaporator of the air conditioner, toward a passenger room.

2. Description of the Related Art

In order to clarify the task of the present invention, a known automotive air conditioner 100 of the above-mentioned type will be discussed with reference to FIG. 10 of the accompanying drawings.

In the drawing, denoted by reference "Dp" is a dash panel of a motor vehicle, which parts an engine room "E" and a passenger room "R". Denoted by reference "Fp" is a floor panel of the vehicle. Denoted by reference "M" is a fixed cross bar which extends across a front area of the passenger room "R".

As shown, the air conditioner 100 is supported by the cross bar and comprises a housing in which a generally U-shaped air flow passage "F" is defined.

A cylindrical multiblade fan 11 is installed in an upstream part of the air flow passage "F". The upstream part constitutes a scroll 12. Downstream of the scroll 12, there is installed a rectangular parallelopiped evaporator 13. The evaporator 13 is inclined with its lowered rear end located just above the lowermost part 14 of the air flow passage "F". From the lowermost part 14 of the air flow passage "F", there extends obliquely downward a water drain pipe 15, as shown. A heater core 17 is positioned above the evaporator 13 having a partition wall 16 located therebetween. With this partition wall 16, two parallel passages are defined at a part downstream of the evaporator 13, one being a heater core passage 21A in which the heater core 17 is installed and the other being a bypass passage 21B which bypasses the heater core 17. An air mix door 18 is arranged to control an air flow rate between the heater core passage 21A and the bypass passage 21B. An air mix chamber 21C is defined at a part downstream of the two passages 21A and 21B. That is, to the air mix chamber 21C, both the heater core passage 21A and bypass passage 21B are led. A defrosting air inlet opening 22, a ventilating air inlet opening 23 and a foot warming air inlet opening 24 are defined at a portion downstream of the air mix chamber 21C. The defrosting and ventilating air inlet openings 22 and 23 are controlled by a common door, that is, a ventilation/defrosting door 20. The foot warming air inlet opening 24 is controlled by a foot door 19. The air mix door 18, the foot door 19 and the ventilation/defrosting door 20 shown are of a pivot type, which constitute a pivot type door group "D".

In operation, air is introduced into the air flow passage "F" by the fan 11 and guided toward the evaporator 13 as is indicated by the thick white arrow. After being cooled by the evaporator 13, the air is turned upward at the lowermost part 14 of the air flow passage "F" and distributed to the two passages 21A and 21B in accordance with the angular position of the air mix door 18. The air thus warmed from the heater core passage 21A and the air from the bypass passage 21B are mixed in the air mix chamber 21C to produce a temperature-conditioned air and distributed to various given portions of the passenger room "R" through the various air inlet openings 22, 23 and 24.

As shown, during this operation, moisture in air from the fan 11 causes an outer surface of the evaporator 13 to collect a condensed water, and when the water on the outer surface exceeds a certain amount, it produces waterdrops "W" falling from the lower edge of the evaporator 13, as shown, which are led into the water drain pipe 15 and discharged to the outside of the vehicle.

SUMMARY OF THE INVENTION

However, the above-mentioned known automotive air conditioner 100 tends to have the following drawback.

That is, in operation, particularly, when air flow speed is high, some of the waterdrops "W" are blown off and carried by the air that flows through the lowermost part 14 of the air flow passage "F" toward the air mix chamber 21C. In this case, it tends to occur that air actually blown into the passenger room "R" contains waterdrops. Of course, such waterdrops in the air make the passengers in the passenger room "R" uncomfortable. That is, in the air conditioner 100, undesired waterdrops blown off phenomenon easily occurs.

In order to eliminate the above-mentioned drawback, Laid-open Japanese Patent Application (Tokkai) 2000-6644 proposes a measure. That is, this measure is to reduce the air flow speed at a portion where the waterdrops tend to be collected. Due to reduction in air speed at such portion, the waterdrops blown off phenomenon is weakened.

However, even the measure of the published Application has failed to provide car users with a satisfaction. Actually, the waterdrops blown off phenomenon is suppressed to a satisfied level even by the proposed measure.

Accordingly, it is an object of the present invention to provide an automotive air conditioner which is free of the above-mentioned drawbacks.

That is, an object of the present invention is to provide an automotive air conditioner which is equipped with a waterdrops blown off suppression structure by which the undesired waterdrops blown off phenomenon is effectively suppressed.

More specifically, an object of the present invention is to provide an automotive air conditioner which is equipped with an improved water guide structure through which a condensed water inevitably produced on outer surface of an evaporator is instantly and smoothly discharged to the outside of the air conditioner.

According to the present invention, there is provided an automotive air conditioner which comprises a housing having an air flow passage defined therein, the housing including mutually opposed side walls between which a part of said air flow passage is defined; a fan installed in an upstream part of the air flow passage to introduce air into the air flow passage; and an evaporator installed in the air flow passage at a position downstream of the fan, the evaporator being of a stack type including a plurality of flat tube elements which are stacked on one another, every adjacent two of the flat tube elements leaving therebetween a clearance which has inlet and outlet sides, wherein the evaporator is postured in such a manner that the flat tube elements extend between the mutually opposed side walls of the housing having the inlet sides of the clearances of the flat tube elements directed upstream toward the fan.

BRIEF DESCRIPTION OF THE DRAWINGS

Other objects and advantages of the present invention will become apparent from the following description when taken in conjunction with the accompanying drawings, in which:

FIG. 5 is a plan view of the evaporator employed in the first embodiment;

FIG. 5A is a plan view of one of first group of flat tube elements of the evaporator;

FIG. 5B is a plan view of one of second group of flat tube elements of the evaporator;

DETAILED DESCRIPTION OF THE EMBODIMENTS

In the following, two embodiments of the present invention will be described in detail with reference to the accompanying drawings.

For ease of understanding, various directional terms, such as, right, left, upper, lower, rightward, etc., are included in the following description. However, such terms are to be understood with respect to only a drawing or drawings on which the corresponding part or portion is illustrated.

Figure 1:
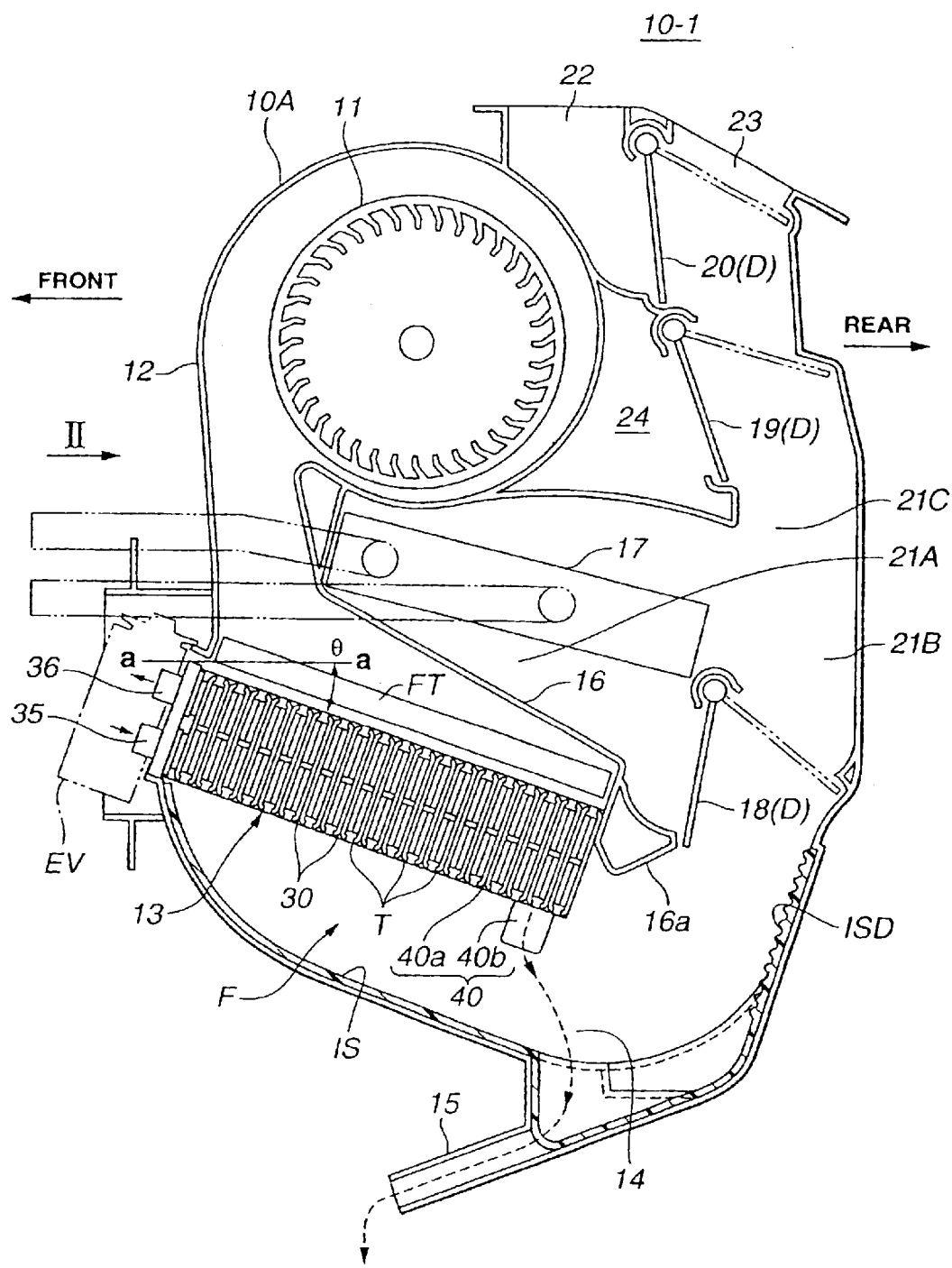
FIG. 1 is a sectional view of an automotive air conditioner which is a first embodiment of the present invention.

Referring to FIG. 1, there is shown an automotive air conditioner 10-1 which is a first embodiment of the present invention.

Figure 10:
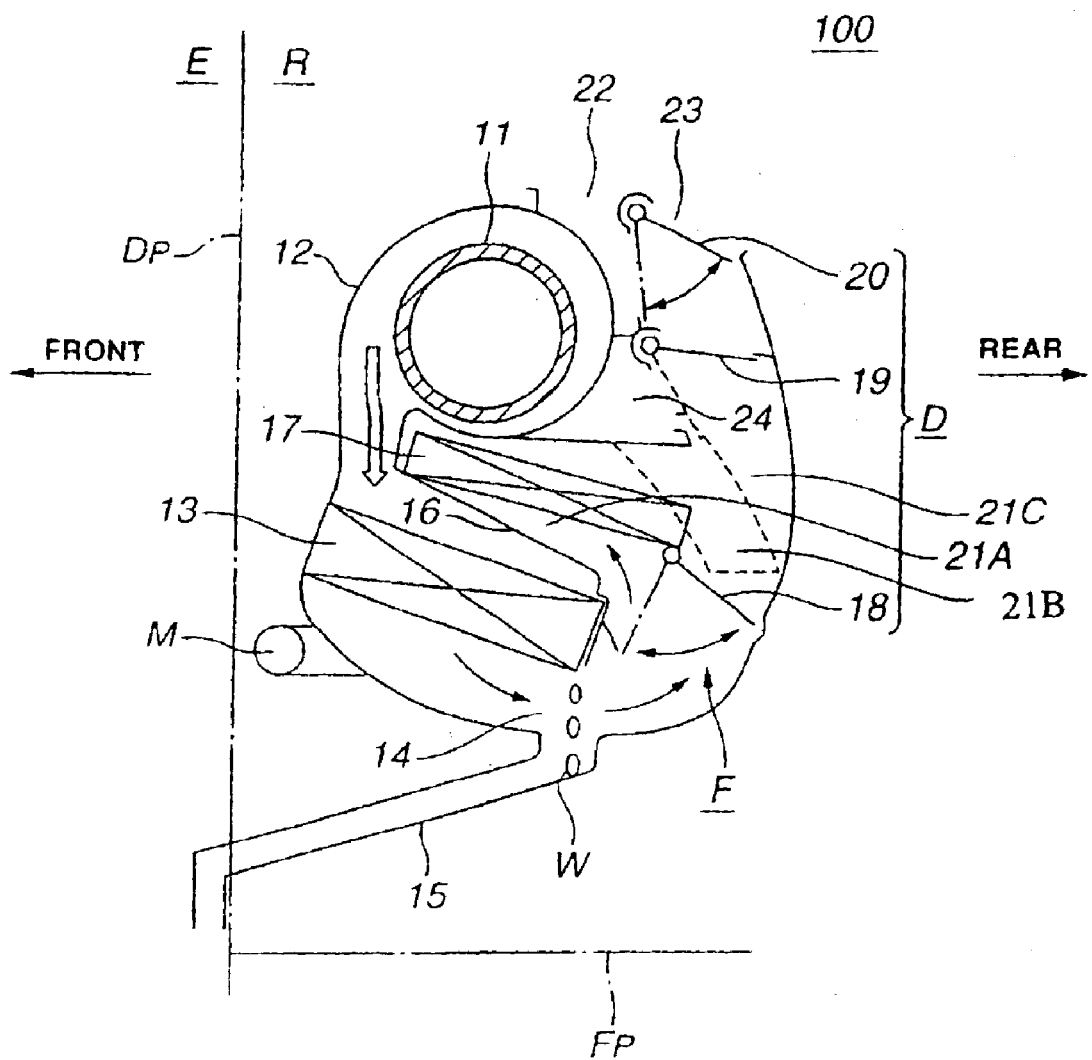
FIG. 10 is a schematic view of an automotive air conditioner of a related art.

As shown, the automotive air conditioner 10-1 of the first embodiment is similar in construction to the above-mentioned known air conditioner 100 of FIG. 10.

That is, the air conditioner 10-1 comprises a housing 10A in which a generally U-shaped air flow passage "F" is defined. A cylindrical multiblade fan 1 is installed in an upstream portion of the air flow passage "F". The upstream portion constitutes a scroll 12. An evaporator 13 is positioned downstream of the scroll 12. The evaporator 13 has an air filter "FT" mounted on an upward upper side thereof. The evaporator 13 is rectangular parallelopiped in shaped and inclined with its lowered right (viz., rear) end located above the lowermost part 14 of the air flow passage "F".

As shown, the inner surface of the lower portion of the housing 10A is lined with a heat insulating sheet "IS" for keeping the temperature of air which has just passed through the evaporator 13. Due to provision of the heat insulating sheet "IS", the outer surface of the lower portion of the housing 10A is suppressed from producing a condensed water.

As shown in FIG. 1, the heat insulating sheet "ISD" is provided at its downstream part with a plurality of dimples "ISD" which are produced by an embossing technique. As will be described in detail hereinafter, if, under operation of the air conditioner 10-1, condensed water happens to flow to the downstream part of the sheet "IS", the dimples "ISD" catch or trap the condensed water.

From the lowermost part 14 of the air flow passage "F", there extends obliquely downward a water drain pipe 15, as shown. A heater core 17 is positioned above the evaporator 13 having a partition wall 16 located therebetween. With this partition wall 16, two parallel passages are defined at a part downstream of the evaporator 13, one being a heater core passage 21A in which the heater core 17 is installed and the other being a bypass passage 21B which bypasses the heater core 17. An air mix door 18 is arranged to control a rate between an air flow amount in the heater core passage 21A and that in the bypass passage 21B. An air mix chamber 21C is defined at a part downstream of the two passages 21A and 21B. That is, to the air mix chamber 21C, both the heater core passage 21A and the bypass passage 21B are led. A defrosting air inlet opening 22, a ventilating air inlet opening 23 and a foot warming air inlet opening 24 are defined downstream of the air mix chamber 21C. The defrosting and ventilating air inlet openings 22 and 23 are controlled by a common door, that is, a ventilation/defrosting door 20. The foot warming air inlet opening 24 is controlled by a foot door 19. The air mix door 18, the foot door 19 and the ventilation/defrosting door 20 shown are of a pivot type, which constitute a pivot type door group "D".

The air conditioner 10-1 of the first embodiment has further the following constructional features.

Figure 2:
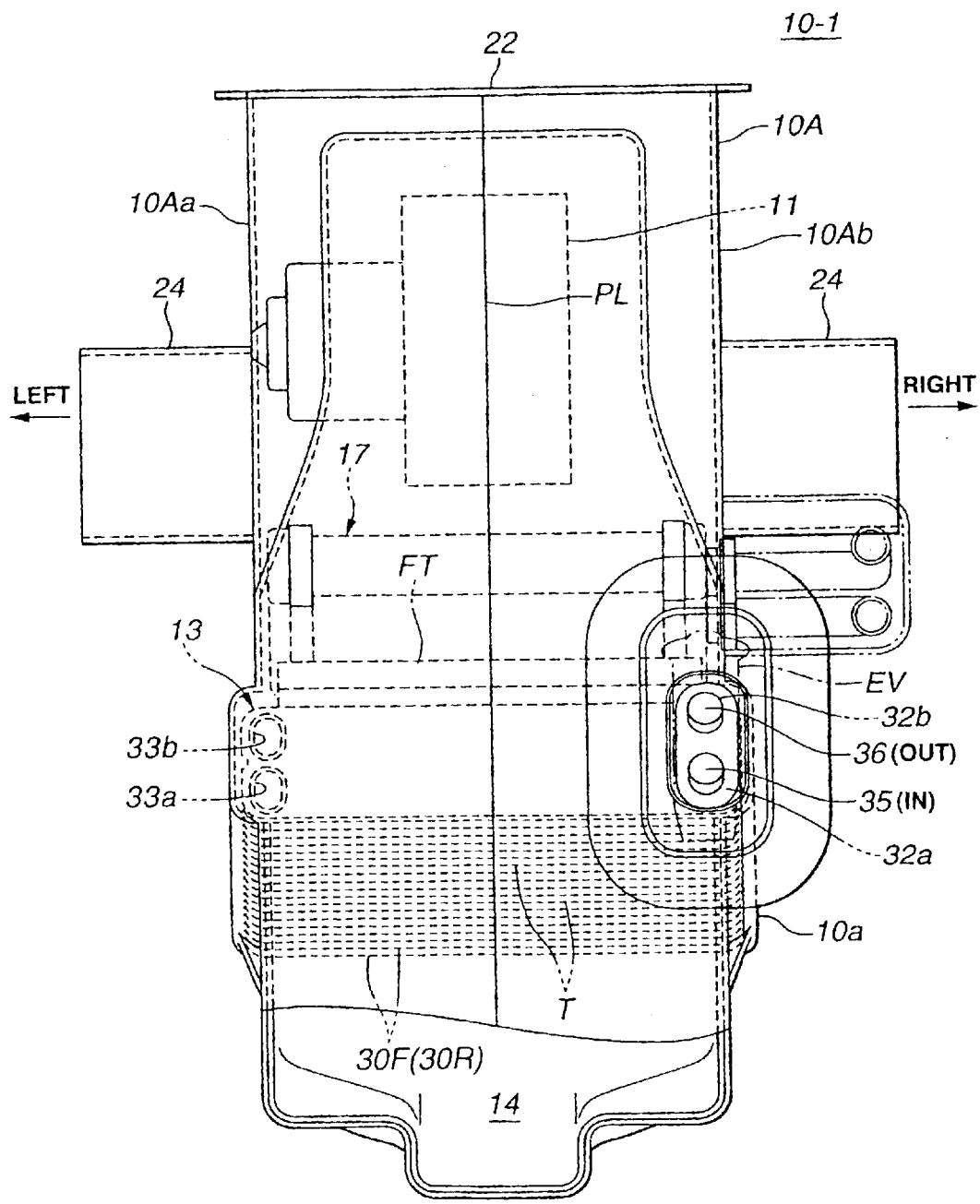
FIG. 2 is a front view taken from the direction of the arrow "II" of FIG. 1.

That is, as is seen from FIG. 2 that is taken from the direction of the arrow "II" of FIG. 1, the housing 10A is of a split type including left and right halves 10Aa and 10Ab which are coupled at a parting line "PL".

Referring back to FIG. 1, the evaporator 13 is inclined by a given angle "θ" relative to a horizontal line "a—a" with its lowered rear end positioned above the lowermost part 14 of the air flow passage "F". In the illustrated example, the angle "θ" is about 19 degrees. However, experiments have revealed that if the angle "θ" is smaller than 45 degrees, adequate performance is obtained by the evaporator 13.

As is seen from FIG. 2, the evaporator 13 is tightly put between respective side walls of the left and right halves 10Aa and 10Ab having its lowered rear end held by a lower end 16a of the partition 16 of the housing 10A.

Figure 3:
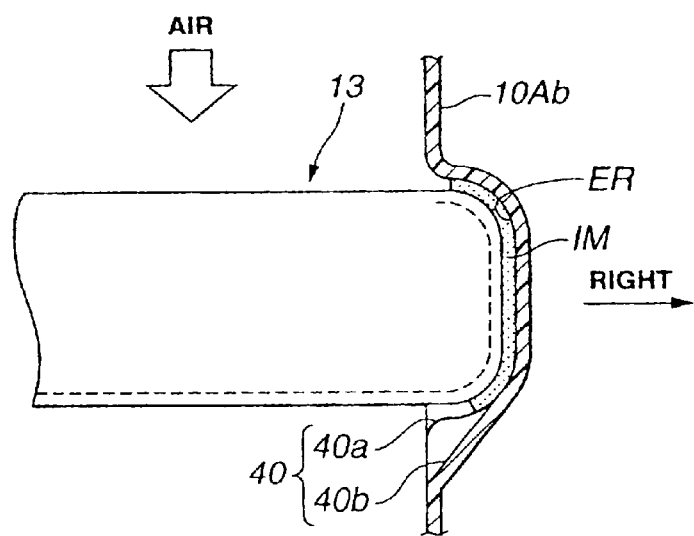
FIG. 3 is a partial sectional view of a holding structure which holds an evaporator employed in the first embodiment.

As is seen from FIG. 3, the side wall of each of the halves 10Aa and 10Ab is formed at an inner surface thereof an elongate recess "ER" to receive a corresponding side portion of the evaporator 13. A heat insulating material "IM" is tightly put between the side portion of the evaporator 13 and the elongate recess "ER".

Referring to FIGS. 4, 5, 5A and 5B, there is shown the detail of the evaporator 13. As shown, the evaporator 13 is of a stack type.

As is seen from FIGS. 5, 5A and 5B, the stack type evaporator 13 comprises generally a first group of flat tube elements 30F which are stacked on one another and positioned at a front half zone 13F, a second group of flat tube elements 30R which are stacked on one another and positioned at a rear to half zone 13R and a plurality of heat radiation fins 31 which are respectively interposed between adjacent two of the first group of flat tube elements 30F and between adjacent two of the second group of flat tube elements 30R. Every adjacent two of the first and second groups of flat tube elements 30F and 30R leave therebetween a clearance which has inlet and outlet sides.

Each of the flat tube elements 30F and 30R includes two mutually coupled shell plates. As will be understood as the description proceeds, upon assembly of the evaporator 13, four tank passages, that is, an upstream tank passage 32a, a downstream tank passage 32b, a first intermediate tank passage 33a and a second intermediate tank passage 33b are defined in lateral side portions of the evaporator 13. As is seen from FIG. 6, the upstream and downstream tank passages 32a and 32b are located at one side of the evaporator 13 and the first and second intermediate passages 33a and 33b are located at the other side of the evaporator 13.

As is seen from FIG. 5A, each of the first group of flat tube. elements 30F comprises a generally U-shaped passage 34a having first inlet and outlet openings 33a' and 33b', and second inlet and outlet openings 32a' and 32b' which are isolated from the U-shaped passage 34a. While, each of the second group of flat tube elements 30R comprises two straight passages 34b and 34c, first inlet and outlet openings 33b" and 32b" possessed by the passage 34b and second inlet and outlet openings 32a" and 33a" possessed by the other passage 34c.

Thus, when the first and second groups of flat tube elements 30F and 30R are properly stacked in the above-mentioned manner, the first inlet openings 33a' of the first group of flat tube elements 30F and the second outlet openings 33a" of the second group of flat tube elements 30R are connected to constitute the above-mentioned first intermediate tank passage 33a. At the same time, the first outlet openings 33b' of the first group of flat tube elements 30F and the first inlet openings 33b" of the second group of flat tube elements 30R are connected to constitute the second intermediate tank passage 33b, the second inlet openings 32a' of the first group of flat tube elements 30F and the second inlet openings 32a" of the second group of flat tube elements 30R are connected to constitute the upstream tank passage 32a, and the second outlet openings 32b' of the first group of flat tube elements 30F and the second outlet openings 32b" of the second group of flat tube elements 30R are connected to constitute the downstream tank passage 32b.

Figure 6:
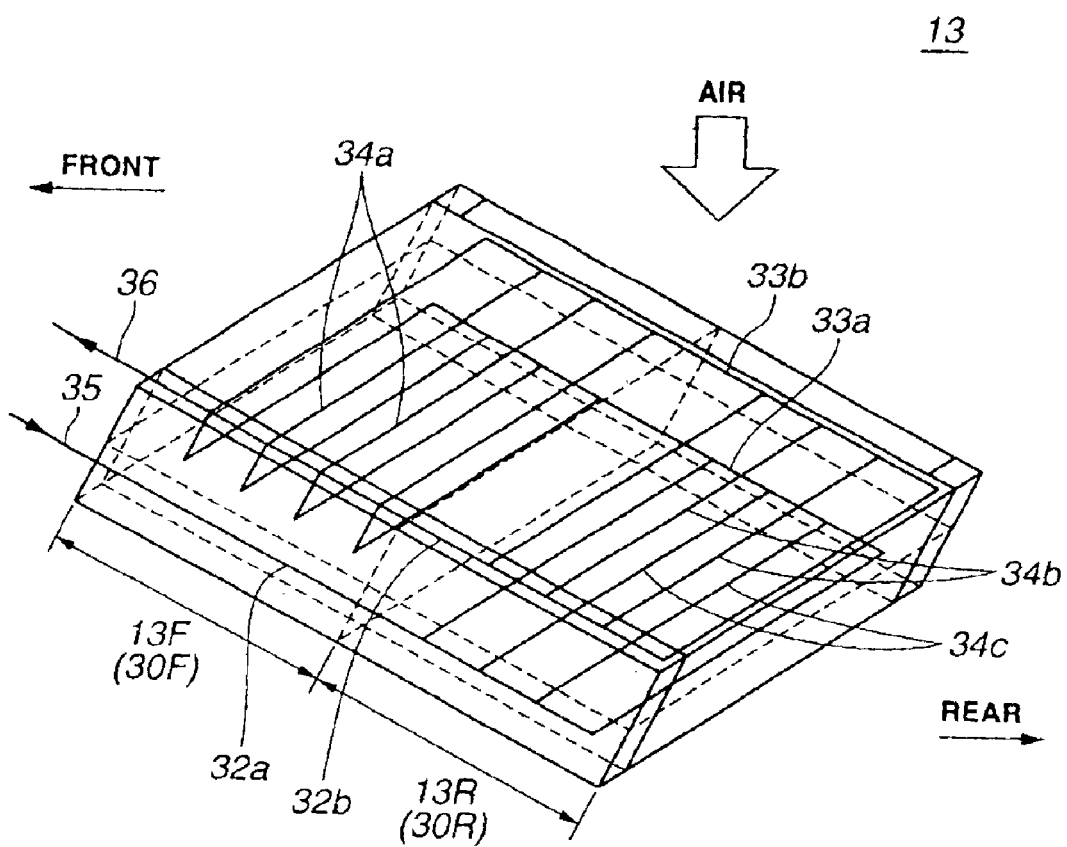
FIG. 6 is a schematic illustration of the evaporator showing an entire path through which a refrigerant flows.

FIG. 6 shows schematically an entire flowing path for the refrigerant, that is defined when the evaporator 13 is assembled. As is seen from this drawing and FIG. 1, the upstream tank passage 32a has an inlet opening 35, and the downstream tank passage 32b has an outlet opening 36 from which a warmed refrigerant is led toward a compressor (not shown).

As is seen from FIG. 6, under operation of the evaporator 13, a cooled refrigerant from an expansion valve "EV" (see FIGS. 1 and 2) is led into the inlet opening 35 of the upstream tank passage 32a, and led to the first intermediate tank passage 33a through the straight passages 34c of the second group of flat tube elements 30R, and then led to the second intermediate tank passage 33b through the U-shaped passages 34a of the first group of flat tube elements 30F, and then led to the downstream tank passage 32b through the straight passages 34b of the second group of flat tube elements 30R, and discharged from the outlet opening 36 of the downstream tank passage 32b toward a compressor (not shown).

As is understood from FIGS. 1 and 2, when properly mounted in the housing 10A, the evaporator 13 is postured so that a front face of the evaporator 13 where the inlet and outlet openings 35 and 36 are provided faces forward of an associated motor vehicle. Furthermore, as is seen from FIG. 2, when viewed from the front of the vehicle, the inlet and outlet openings 35 and 36 are positioned at a right side and the first and second intermediate tank passages 33a and 33b are positioned at a left side, with respect to the parting line "PL" of the housing 10A. The outlet opening 36 is positioned above the inlet opening 35.

The positional relation of the entire path in the evaporator 13 to the housing 10A will be best understood from FIG. 6 which shows the direction, viz., front and rear, with respect to the vehicle body.

Figure 4:
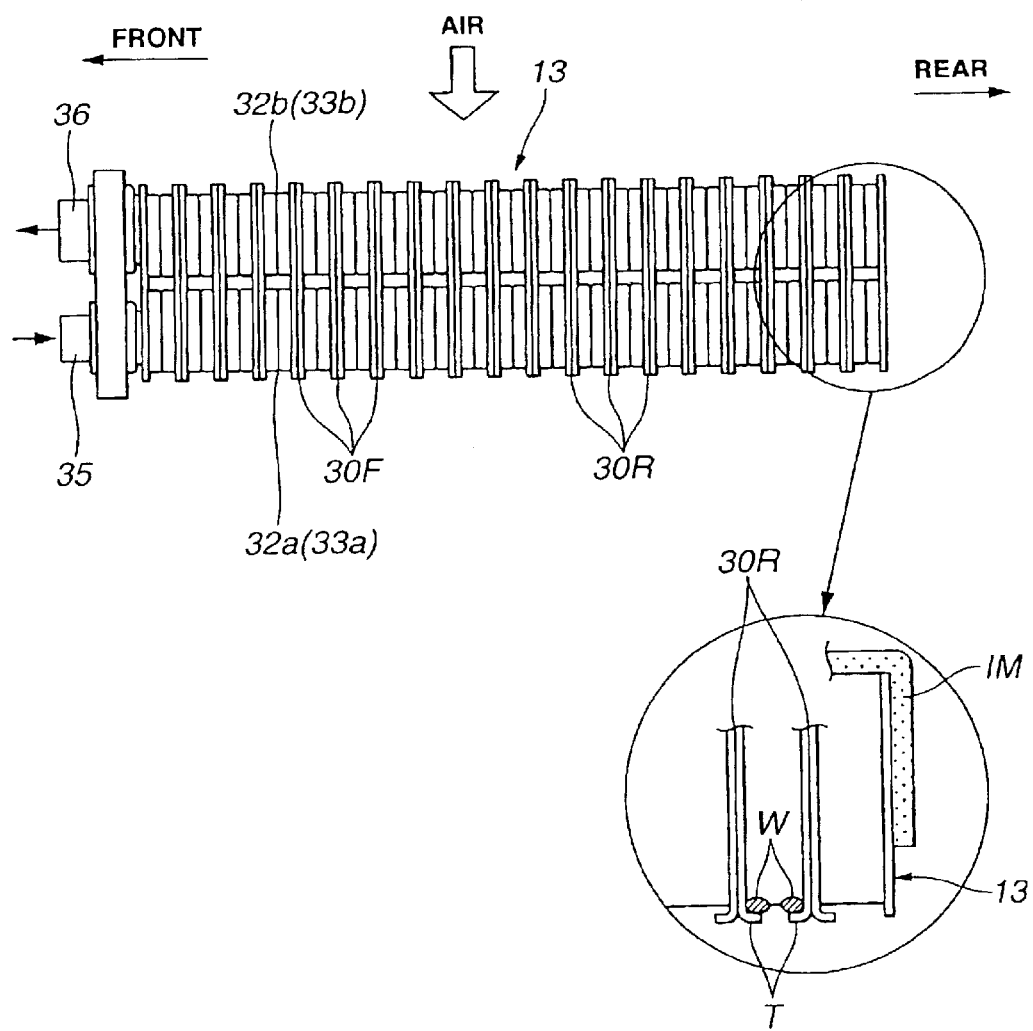
FIG. 4 is a side view of the evaporator employed in the first embodiment.

As is seen from FIG. 4, the mutually coupled shell plates of each flat tube element 30F or 30R are provided at the lower edges with respective flanges "T" which are sized to hold or carry water mass "W" that is produced upon cooling of flowing air by the evaporator 13. As shown, due to their facing arrangement, all adjacent two of the flanges "T" constitute water guide gutters which extend laterally when viewed in FIG. 2, that is, between the left and right halves 10Aa and 10Ab of the housing 10A. As will be described in detail hereinafter, under operation of the evaporator 13, condensed water flows down on the surfaces of the flat tube elements 30F and 30R of the evaporator 13 and is collected by the water guide gutters "T", and due to the force of air flowing through the evaporator 13, the condensed water in each gutter "T" is forced to flow laterally (as viewed in FIG. 2) in and along the gutter "T", that is, toward the walls of the left and right halves 10Aa and 10Ab of the housing 10A.

Figure 7:
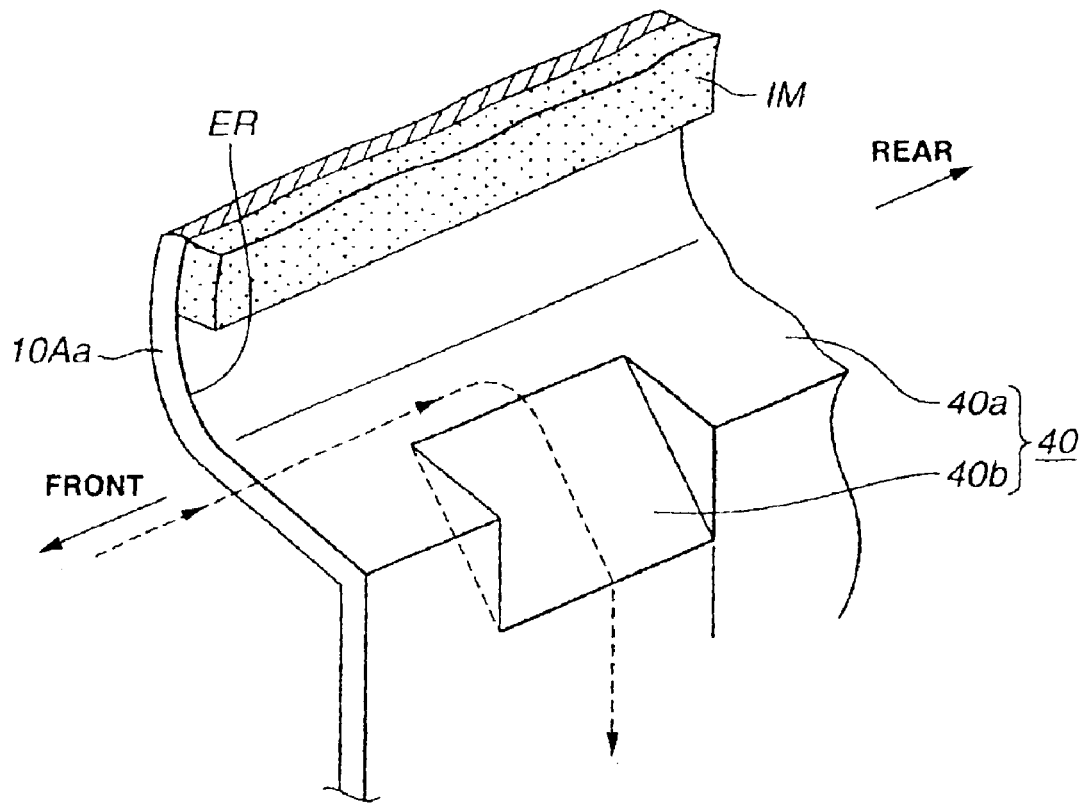
FIG. 7 is a partial perspective view of a side wall of a housing employed in the first embodiment, showing a water guide structure defined by the side wall.

As is seen from FIGS. 1, 3 and 7, each of the left and right halves 10Aa and 10Ab of the housing 10A is formed with an elongate step 40a which extends diagonally along each side lower edge of the evaporator 13. Actually, as is seen from FIG. 3, the elongate step 40a constitutes a lower edge portion of the elongate recess "ER" of each half 10Aa or 10Ab of the housing 10A. It is thus to be noted that the elongate step 40a is sloped in the fore-and-aft direction.

As is seen from FIGS. 1 and 7, the elongate step 40a of each half 10Aa or 10Ab is formed, at a given position where the lowered rear end of the evaporator 13 is placed, with a drain cut 40b. That is, elongate step 40a and the drain cut 40b constitute a water guide structure 40 through which the condensed water flows from the outer surfaces of the evaporator 13 toward a lower surface part of the half 10Aa or 10Ab of the housing 10A.

It is to be noted that due to provision of the water guide structure 40, the condensed water from the evaporator 13 is forced to flow flatly and downward on the lower surface part of the half 10Aa or 10Ab of the housing 10A which is exposed to lowermost part 14 of the air flow passage "F".

As is seen from FIG. 4, the heat insulating material "IM" through which the lowered rear end of the evaporator 13 is held by the lower end 16a of the partition wall 16 (see FIG. 1) has such a size as to expose the lower portion of the lowered rear end of the evaporator 13. Due to provision of such exposed portion, undesirable water gathering at such end portion is suppressed. Furthermore, due to provision of the exposed portion, the water holding capacity of the water guide structure 40 is increased.

In the following, operation of the automotive air conditioner 10-1 of the first embodiment will be described with the aid of the drawings, especially FIG. 1.

When, for example, controlled to take a COOLING mode, the air conditioner 10-1 assumes such a condition as shown in FIG. 1. Under this condition, the cooling system operates feeding the evaporator 13 with a refrigerant from the inlet opening 35, the air mix door 18 assumes a position to fully close the heater core passage 21A (viz., a position fully open the bypass passage 21B), the ventilation/defrosting door 20 assumes a position to fully open the ventilation air inlet opening 23 and the foot door 19 assumes a position to fully close the foot warming air inlet opening 24.

Under this condition, air introduced into the upstream part of the air flow passage "F" by the fan 11 is directed toward the evaporator 13 and passed through the same while being cooled. The cooled air is then turned upward at the lowermost part 14 of the passage "F" and directed toward the ventilation air inlet opening 23. Thus, from ventilation blowing nozzles exposed to a passenger room, the cooled air is blown to a given portion of the passenger room for cooling the room.

During this cooling operation, moisture in air is forced to produce a condensed water on the outer surfaces of the flat tube elements 30F and 30R of the evaporator 13, and as is seen from FIG. 4, the condensed water flows down to the water guide gutters "T" of the evaporator 13 to produce water mass "W" on the gutters "T". As has been mentioned hereinabove, due to the force of air flowing through the evaporator 13, the water mass "W" in each gutter "T" is forced to flow laterally (as viewed in FIG. 2) in and along the gutter "T", that is, toward the walls of the left and right halves 10Aa and 10Ab of the housing 10A.

The water mass "W" is thus led to the sloped elongate step 40a of the wall of each of the left and right halves 10Aa and 10Ab and flows downward on the step 40a toward the rear end of the step 40a.

As is indicated by a dotted line in FIG. 7, when the water mass "W" flows to the given position where the lowered rear end of the evaporator 13 is placed, it slides down into the drain cut 40b and flows down on the lower surface part of the half 10Aa or 10Ab of the housing 40.

As is seen from the dotted line in FIG. 1, the water mass "W" flowing down on the lower surface part is led to the lowermost part 14 of the air flow passage "F" and led into the water drain pipe 15 to be discharged to the outside of the air conditioner 10-1.

In the following, unique arrangement of parts and various advantages given by the arrangement will be discussed with the aid of the drawings.

First, as is seen from FIG. 1, the evaporator 13 is installed in the housing 10A taking an inclined posture. This allows the housing 10A to have a reduced size and brings about a compact construction of the air conditioner 10-1.

Second, as is seen from FIG. 2, the flat tube elements 30F and 30R of the evaporator 13 are arranged to extend between the left and right halves 10Aa and 10Ab of the housing 10A. This means that the water guide gutters "T" provided at the lower ends of the flat tube elements 30F and 30R extend between the left and right halves 10Aa and 10Ab. Thus, condensed water flowing down over the surfaces of the flat tube elements 30F and 30R is led into the water guide gutters "T" and guided to the respective elongate steps 40a of the left and right halves 10Aa and 10Ab of the housing 10A. In other words, even when the evaporator 13 is inclined with its rear end lowered as shown in FIG. 1, the lowered rear end of the evaporator 13 is suppressed from collecting water mass. If the water mass is collected in the lowered rear end and grown there, it is easily blown off by the wind pressure produced by air flow. This causes the air actually blown into the passenger room to contain waterdrops.

Third, as is seen from FIG. 2, the first and second intermediate tank passages 33a and 33b and the upstream and downstream tank passages 32a and 32b of the evaporator 13 are respectively put in the elongate recesses "ER" of the halves 10Aa and 10Ab of the housing 10A. Thus, provision of such tank passages 33a, 33b, 32a and 32b has substantially no influence on increase in air flow resistance possessed by the air flow passage "F".

Fourth, due to provision of the water guide gutters "T" and the water guide structure 40, all of the condensed water produced on the outer surfaces of the flat tube elements 30F and 30R is smoothly and quickly led to the water drain pipe 15 in the above-mentioned manner. Thus, undesired waterdrops blown off phenomenon is suppressed or at least minimized in the air conditioner 10-1 of the first embodiment.

The followings are four factors that may have a certain influence on the waterdrops blown off suppressing function.

(1) Arrangement wherein the flat tube elements 30F and 30R extend each between the left and right halves 10Aa and 10Ab of the housing 10A.

(2) Provision of the water guide structure 40 including the elongate steps 40a and drain cut 40b.

(3) Provision of the water guide gutters "T" provided by the flat tube elements 30F and 30R.

(4) Arrangement wherein the lowered rear end of the evaporator 13 is suppressed from collecting water mass.

Figure 8:
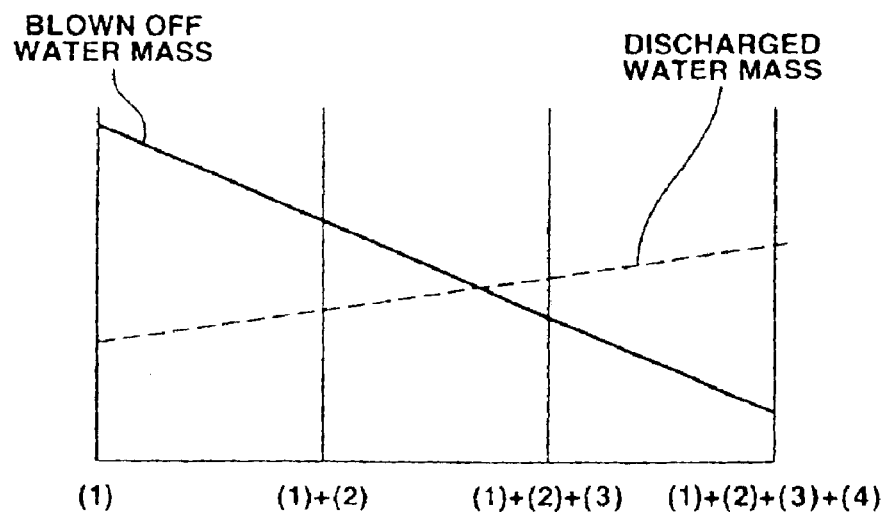
FIG. 8 is a graph showing results of an experiment applied to the air conditioner of the first embodiment.

By combining these factors, the inventors examined the waterdrops blown off suppressing function in terms of "blown off water mass" and "discharged water mass". The blown off water mass was the water mass left in the air actually blown into the passenger room and the discharged water mass was the water mass actually discharged to the outside from the water drain pipe 15. The results are shown in the graph of FIG. 8. As is seen from this graph, with increase of the factors, the "blown off water mass" was decreased and the "discharged water mass" was increased.

Figure 9:
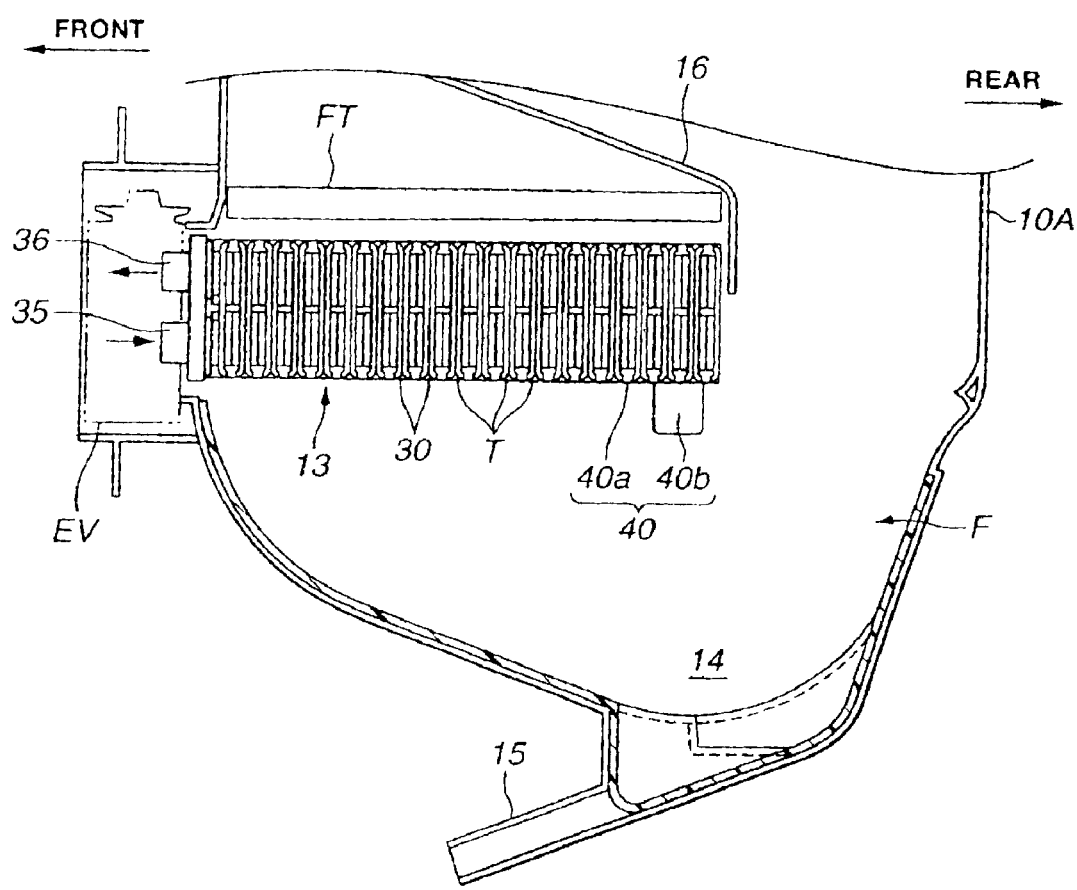
FIG. 9 is a sectional view of an essential portion of an automotive air conditioner which is a second embodiment of the present invention.

Referring to FIG. 9, there is shown but partially an automotive air conditioner 10-2 which is a second embodiment of the present invention.

The air conditioner 10-2 of this second embodiment is substantially the same as the above-mentioned air conditioner 10-1 of the first embodiment except that in the second embodiment the evaporator 13 is arranged horizontally in the air flow passage "F" as shown.

With the horizontal arrangement of the evaporator 13, the following advantages are obtained in addition to the above-mentioned advantages given to the first embodiment 10-1.

That is, as is seen from FIG. 9, air from the fan (11) can smoothly pass through the evaporator 13 because the passages defined between the flat tube elements 30F and 30R are in parallel with the flowing direction of air. Due to this smoothed air flow in the passages, condensed water produced on the outer surfaces of the flat tube elements 30F and 30R is smoothly guided to the water guide gutters "T" without being blown off by the air flow.

Furthermore, due to the smoothed air flow in the passages of the evaporator 13, the air flow passage "F" can have a reduced air flow resistance.

In the following, modifications of the automotive air conditioner of the present invention will be briefly described.

The above description is directed to an air conditioner of integral type. However, if desired, the invention may be applied to an air condition of combination type that includes an intake unit, a cooler unit and a heater unit.

In the first embodiment of FIG. 1, the evaporator 13 is inclined with its rear end lowered. However, if desired, the evaporator 13 may be inclined with its front end lowered.

Furthermore, if desired, sloped gutter members may be connected to the water guide gutters "T" for much smoothing the water flow toward the drain cuts 40b of the water guide structure 40.

The entire contents of Japanese Patent Application 2001-189129 filed Jun. 22, 2001 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. An automotive air conditioner comprising:
   a housing having mutually opposed vertical side walls between which an air flow passage is defined and along which said air flow passage extends from an upstream position toward a downstream position;
   a fan installed in an upstream part of said air flow passage to introduce air into said air flow passage; and
   an evaporator installed in said air flow passage at a position downstream of said fan, said evaporator being of a stack type including a plurality of flat tube elements which are stacked on one another, every adjacent two of said flat tube elements leaving therebetween a clearance which has inlet and outlet sides, said evaporator is postured in such a manner that said flat tube elements extend between said mutually opposed vertical side walls of said housing having the inlet sides of the clearances of said tube elements directed upstream toward said fan;
   a water guide structure provided adjacent to each of said mutually opposed vertical side walls of said housing to guide condensed water from outer surfaces of said flat tube elements toward lower portions of said mutually opposed vertical side walls,
   said water guide structure including:
      an elongate step formed on each of said mutually opposed vertical side walls for holding thereon one lateral side of said evaporator;
      a drain cut provided at a lower end portion of said elongate step; and
      a drain opening provided at a lowermost position of said air flow passage,
      wherein the condensed water is guided to flow from the outer surfaces of said flat tube elements toward said drain opening through said elongate step and said drain cut.

2. An automotive air conditioner as claimed in claim 1, further comprising:
   a plurality of water guide gutters provided at a downstream face side of said evaporator where the outlet sides of the clearances are exposed, said water guide gutters extending between said mutually opposed side walls of said housing to receive the condensed water flowing thereto from outer surfaces of said flat tube elements and guide the condensed water toward the mutually opposed side walls.

3. An automotive air conditioner as claimed in claim 2, in which each of said water guide gutters comprises:
   a first lower bent edge of one of adjacent two of said flat tube elements; and
   a second lower bent edge of the other of the adjacent two of said flat tube elements,
   wherein said first and second lower bent edges are directed toward each other.

4. An automotive air conditioner as claimed in claim 2, further comprising a water drain pipe connected to the lowermost position of said air flow passage to guide the condensed water from said given lower portions of the mutually opposed side walls to the outside of said housing.

5. An automotive air conditioner as claimed in claim 4, in which said mutually opposed side walls of said housing are respectively formed with elongate recesses into which lateral sides of said evaporator are received with a heat insulating material interposed therebetween.

6. An automotive air conditioner as claimed in claim 5, in which said evaporator is inclined with respect to the upstream portion of said air flow passage and in which said elongate recesses being inclined to meet the inclination of said evaporator.

7. An automotive air conditioner as claimed in claim 6, in which said evaporator is inclined with its rear end portion lowered.

8. An automotive air conditioner as claimed in claim 6, wherein said elongate step constitutes a lower edge portion of the elongate recess.

9. An automotive air conditioner as claimed in claim 5, in which said evaporator is arranged perpendicularly with respect to the upstream portion of said air flow passage.

10. An automotive air conditioner as claimed in claim 7, in which the lowered rear end portion of said evaporator is positioned above the lowermost part of said air flow passage and in which said water drain pipe extends downward from said lowermost part.

11. An automotive air conditioner as claimed in claim 10, in which the lowered rear end portion of said evaporator is held by a partition wall installed in said housing.

12. An automotive air conditioner as claimed in claim 4, in which said air flow passage of the housing is provided, at a portion downstream with said evaporator, with a heat insulating sheet which is lined on an inner surface of said housing.

13. An automotive air conditioner as claimed in claim 1, wherein said evaporator is inclined having its downstream end positioned below its upstream end with respect to an air flow flowing in said air flow passage.

14. An automotive air conditioner as claimed in claim 13, wherein said drain cut is positioned in the vicinity of said downstream end of said evaporator.

15. An automotive air conditioner comprising:
   a housing having an air flow passage defined therein, said housing including mutually opposed vertical side walls between which a part of said air flow passage is defined;
   a fan installed in an upstream part of said air flow passage to introduce air into said air flow passage;
   an evaporator installed in said air flow passage at a position downstream of said fan, said evaporator being of a stack type including a plurality of flat tube elements which are stacked on one another, every adjacent two of said flat tube elements leaving therebetween a clearance which has inlet and outlet sides;
   a plurality of water guide gutters provided at a downstream face side of said evaporator where the outlet sides of the clearances are exposed, said water guide gutters extending between said mutually opposed side walls of said housing to receive the condensed water flowing thereto from outer surfaces of said flat tube elements and guide the condensed water toward the mutually opposed side walls; and
   a water guide structure provided by each of the mutually opposed side walls of the housing to guide the condensed water from said water guide gutters toward given lower portions of the mutually opposed side walls, wherein said evaporator is postured in such a manner that said flat tube elements extend between said mutually opposed vertical side walls of said housing having the inlet sides of the clearances of said tube elements directed upstream toward said fan, wherein said air flow passage of the housing is provided, at a portion downstream with said evaporator, with a heat insulating sheet which is lined on an inner surface of said housing, and wherein said heat insulating sheet is formed at its downstream part with a plurality of dimples.

16. An automotive air conditioner comprising:

a housing having an air flow passage defined therein, said housing including mutually opposed vertical side walls between which a part of said air flow passage is defined;

a fan installed in an upstream part of said air flow passage to introduce air into said air flow passage; and an evaporator installed in said air flow passage at a position downstream of said fan, said evaporator being of a stack type including a plurality of flat tube elements which are stacked on one another, every adjacent two of said flat tube elements leaving therebetween a clearance which has inlet and outlet sides, wherein said evaporator is postured in such a manner that said flat tube elements extend between said mutually opposed vertical side walls of said housing having the inlet sides of the clearances of said tube elements directed upstream toward said fan, wherein said mutually opposed vertical side walls of said housing are respectively formed with elongate recesses into which lateral sides of said evaporator are received with a heat insulating material interposed therebetween, wherein one of said lateral sides of said evaporator comprises upstream and downstream tank passages of said evaporator, and wherein the other of said lateral sides of evaporator comprises first and second intermediate tank passages of said evaporator, and wherein the upstream and downstream tank passages are located in the elongate recesses in the vertical side walls of said housing.

17. An automotive air conditioner as claimed in claim 16, in which said evaporator comprises:

a first group of flat tube elements which are stacked on one another;

a second group of flat tube elements which are stacked on one another and positioned behind said first group of flat tube elements; and a plurality of heat radiation fins which are respectively interposed between every adjacent two of the first and second groups of flat tube elements, wherein each of the first group of flat tube elements comprises a generally U-shaped passage having first inlet and outlet openings and second inlet and outlet openings which are isolated from the U-shaped passage, and each of the second group of flat tube elements comprises two straight passages, first inlet and outlet openings possessed by one of the two straight passages and second inlet and outlet openings possessed by the other of the two straight passages, and wherein said first inlet openings of said first group and the second outlet openings of said second group are connected to constitute said first intermediate tank passage, and said first outlet openings of said first group and said first inlet openings of said second group are connected to constitute said second intermediate tank passage, said second inlet openings of said first group and said second inlet openings of said second group are connected to constitute said upstream tank passage and said second outlet openings of said first group and said second outlet openings of said second group are connected to constitute said downstream tank passage.

* * * * *